2 Sheets—Sheet 1.

D. HAYES & W. FREE,

Said FREE assignor, by mesne assignments, to said HAYES.

Fire-Escape Ladder.

No. 8,758. Reissued June 17, 1879.

Witnesses

Geo. H. Strong.

Frank K. Bartlett

Inventors

Daniel Hayes & Wm. Free

By Dewey & Co.

attys

N. PETERS, PHOTO-LITHOGRAPHER, WASHINGTON, D. C.

2 Sheets—Sheet 2.

D. HAYES & W. FREE,

Said FREE assignor, by mesne assignments, to said HAYES.

Fire-Escape Ladder.

No. 8,758. Reissued June 17, 1879.

Witnesses

Geo. H. Strong

Frank A. Brooks

Inventors

Daniel Hayes

Wm. Free

By Dewey & Co.

Attys

N. PETERS, PHOTO-LITHOGRAPHER, WASHINGTON, D. C.

UNITED STATES PATENT OFFICE

DANIEL HAYES AND WILLIAM FREE, OF SAN FRANCISCO, CALIFORNIA; SAID FREE ASSIGNOR, BY MESNE ASSIGNMENTS, TO SAID HAYES.

IMPROVEMENT IN FIRE-ESCAPE LADDERS.

Specification forming part of Letters Patent No. 74,821, dated February 25, 1868; Reissue No. 8,758, dated June 17, 1879; application filed February 19, 1879.

*To all whom it may concern:*

Be it known that we, DANIEL HAYES and WILLIAM FREE, of the city and county of San Francisco and State of California, have invented an Improved Fire-Escape Ladder; and we hereby declare the following to be a full, clear, and exact description thereof.

Our invention relates to an improved fire-escape or extension ladder, which is portable and capable of being rapidly raised to any desired angle between a horizontal and perpendicular without being removed from the truck. It is also so mounted upon the truck by means of a turn-table that it can be turned about a vertical axis to extend in any direction without altering the position of the truck, and the vertical and horizontal motion combined form a universal joint, which, with the extension portion, allows the head of the ladder to be placed at any desired point in a very short time.

Figure 1:
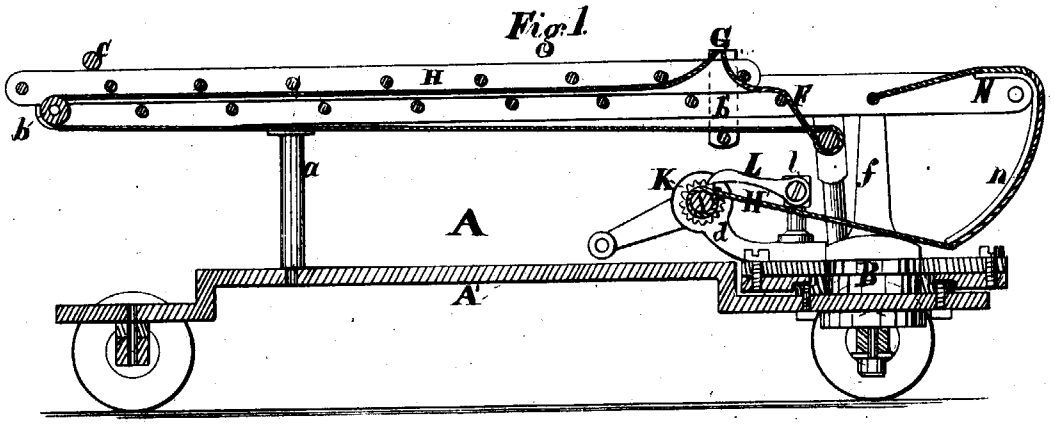
Figure 2:
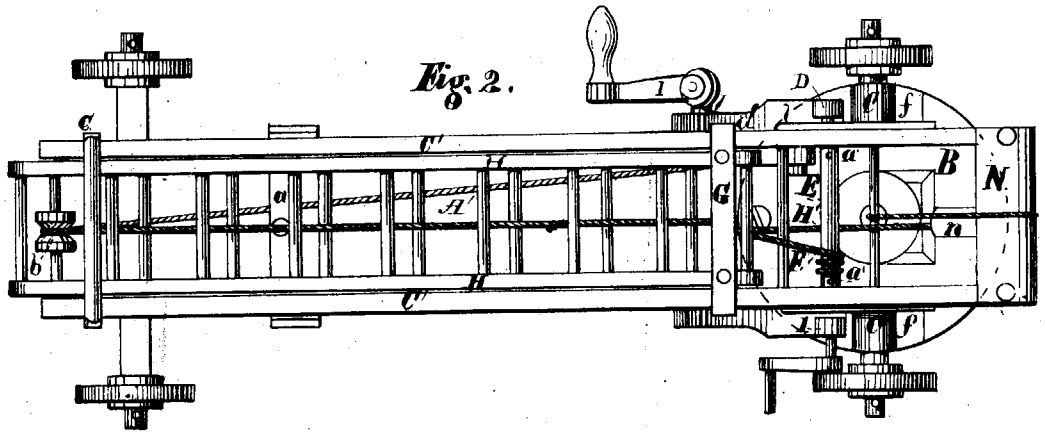
Figure 3:
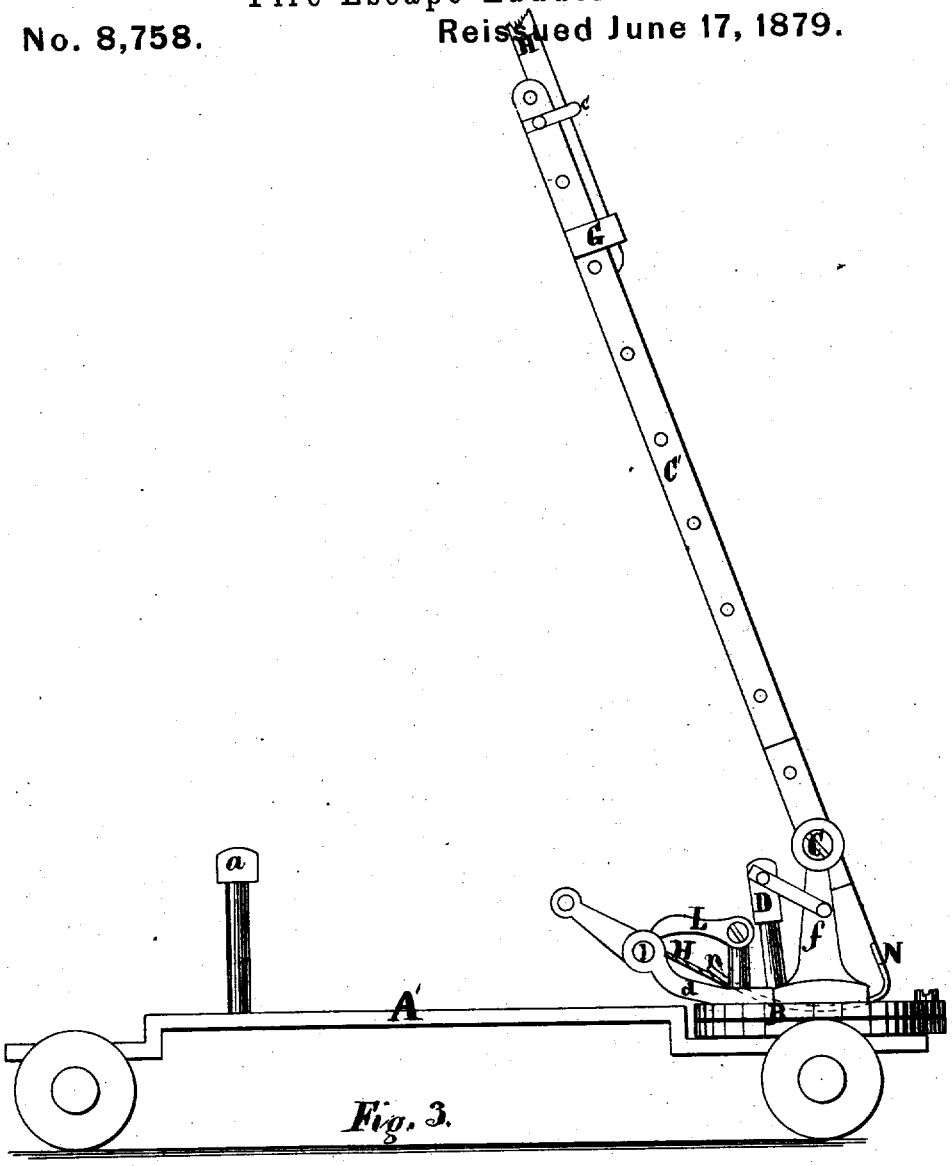

Referring to the accompanying drawings for a more complete explanation of our invention, Figure 1 is a side elevation and longitudinal section of our apparatus. Fig. 2 is a plan or top view. Fig. 3 is a view showing the ladder raised and extended.

The device is intended to provide a ready means of elevating ladders to a greater or less height against a burning building, so as to save life or property.

In order that the extension-ladder may be conveniently carried, an ordinary four-wheeled carriage or truck, A, is employed, having a flat bar, A′, bent at both ends at right angles, and attached to the forward and rear trucks with an upright rest, *a*, for the ladders. On the forward end of the carriage is placed a turn-table, B, which is composed of two plates, one sliding upon the other in a circle, the lower one being bolted to the bar A′, as shown, over the front axle. Upright pillow-blocks *f f* are placed at each side of the turn-table, and trunnions C C, attached to each side of the ladder, have their bearings in said blocks. As these pillow-blocks are placed on the turn-table the ladder C′ may be supported at any angle from a horizontal to a perpendicular, while at the same time the ladder may be turned on the table to face in any direction. The trunnions which support or hinge the ladder are on the upper ends of the pillow-blocks, so there is room enough for the lower end of the ladder to swing down and allow it to be raised vertically.

Back of the pillow-blocks are placed upright standards D D, in which a horizontal hand roller or pulley, E, works across the turn-table. A cord or chain, F, is connected to this roller, passing through two slots, *a′ a′*, and passes around a grooved roller or pulley, *b*, on the top round of the main ladder, the two ends of the cords being attached to a bar, G, which, in turn, is connected to the extension-ladder H. The ends of this bar extend below the main ladder, and have a roller, *b′*, which works against the rails of the main ladder when the small ladder is extended or withdrawn, so as to reduce the friction and render the operation of sliding the small ladder easy. A cross-bar or clip, *c*, is also placed at the upper end of the main ladder, under which the extension slides. By rotating the hand roller or pulley to which this cord or chain is connected the smaller ladder is extended outwardly. For holding the ladder to the desired inclination when it is against the building, another hand-roller, I, is employed, also attached to the upper part of the turn-table, having its bearings in elevated arms *d d*. At one end of the roller a collar is formed, and at the other a ratchet, K, in which is a pawl, L, having its bearings in the post *l*. In the center of the roller I is made a slot, by which one end of the rope or chain H′ is connected, extending over a base-plate, N, with a curved or grooved arm, *n*. The other end of the rope or chain is attached to the lower round of the main ladder, and by turning the roller the ladder is easily raised to the desired angle, where it is kept in place by the pawl, which engages the teeth on the ratchet of the roller, after which the extension may be thrown up by turning the roller or pulley E.

By the means described fire-ladders may be easily raised to a great height at any inclination, and changed by the turn-table to any point of a circle without any necessity of having to turn the truck or carriage. The clip or bar G on the extension-ladder being provided with a friction-roller, which fits against the rails of the main ladder, not only holds the extension-ladder rigidly when it is extended, but prevents its binding as it is slid out.

The whole ladder is really mounted on the turn-table, and, although it folds down when being transported, when it arrives at the place where it is to be used it may be immediately extended and turned in any required direction without having to arrange the position of the truck with reference to the building. The turn-table carrying the ladder being thus mounted on the wheels and truck ready for use requires no adjusting mechanism, and the extension-ladder is readily swung in any direction.

The rope or chain F passes around the pulley or rollers E at the bottom, and winds to the right and left, so that one part is being taken in while the other is being let out. The rope passes from this roller up to and around the pulley or roller *b* at the top, and thence down to the clip or bar G upon the lower end of the extension-ladder H. It will thus be manifest that the action of the roller E will be not only to extend the ladder H, but also to draw it down again, and we can thus draw in the extension when the ladder is at such an angle or in such a position that it would not close up or come down by gravitation.

Having thus described our invention, what we claim as new, and desire to secure by Letters Patent, is—

1. The ladder C′, having the supplemental or extension ladder H, and the operating rope or chain F, pulleys E *b*, and bar G, in combination with the roller *b′* and the cross-bar or clip *c*, whereby the ladders may be extended and the moving parts prevented from binding or separating, substantially as herein described.

2. The combination and arrangement of the curved and grooved arm *n* with the hinged ladder C′, winding-roller I, rope H′, and the turn-table or platform B, substantially in the manner shown and described, and for the purposes set forth.

In witness whereof we have hereunto set our hands.

DANIEL HAYES.
WILLIAM FREE.

Witnesses:
THOS. SAWYER,
CHAS. G. YALE.